(12) United States Patent
Soma

(10) Patent No.: US 12,275,340 B2
(45) Date of Patent: Apr. 15, 2025

(54) CUP HOLDER

(71) Applicant: NIFCO INC., Yokosuka (JP)

(72) Inventor: Toshiaki Soma, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 18/238,727

(22) Filed: Aug. 28, 2023

(65) Prior Publication Data

US 2024/0140291 A1 May 2, 2024

(30) Foreign Application Priority Data

Oct. 28, 2022 (JP) ................................ 2022-173468

(51) Int. Cl.
*B60N 3/10* (2006.01)

(52) U.S. Cl.
CPC ............ *B60N 3/108* (2013.01); *B60N 3/101* (2013.01); *B60N 3/105* (2013.01); *B60N 3/106* (2013.01)

(58) Field of Classification Search
CPC ........ B60N 3/108; B60N 3/101; B60N 3/105; B60N 3/106; B60N 3/102; B60N 3/10
See application file for complete search history.

(56) References Cited

U.S. PATENT DOCUMENTS

| | | | | |
|---|---|---|---|---|
| 1,159,491 A | * | 11/1915 | Graham | A47G 23/0216 220/737 |
| 2,005,293 A | * | 6/1935 | Harris | A47G 33/126 248/522 |
| 2,666,310 A | * | 1/1954 | Hill | A47G 23/0216 248/912 |
| 4,580,412 A | * | 4/1986 | Wells | A47J 41/0044 62/530 |
| 4,628,705 A | * | 12/1986 | Nave | F25D 3/08 62/530 |
| 4,928,873 A | * | 5/1990 | Johnson | A47G 23/0216 220/738 |
| 5,555,746 A | * | 9/1996 | Thompson | B65D 81/3879 215/396 |
| 5,887,709 A | * | 3/1999 | Thompson | B60N 3/10 206/217 |
| 6,196,434 B1 | * | 3/2001 | Angran | B60N 3/108 224/549 |
| 6,506,092 B1 | * | 1/2003 | Kuracina | G10K 11/08 220/759 |
| 6,510,965 B1 | * | 1/2003 | Decottignies | B05B 11/026 222/105 |

(Continued)

FOREIGN PATENT DOCUMENTS

| | | | | |
|---|---|---|---|---|
| CN | 112874404 A | * | 6/2021 | ............... B60N 3/10 |
| GB | 2403194 A | * | 12/2004 | ......... B29C 45/0081 |
| JP | 2010-089592 A | | 4/2010 | |

*Primary Examiner* — Taylor Morris
(74) *Attorney, Agent, or Firm* — HAUPTMAN HAM, LLP

(57) ABSTRACT

A cup holder includes a holder main body having a retaining portion, the retaining portion being configured to receive and hold a beverage container on a bottom wall. The retaining portion includes an upper opening for receiving the beverage container, the bottom wall for supporting a bottom of the beverage container, and a side wall formed between the upper opening and the bottom wall, and has a cylindrical shape. An inner diameter at the upper opening is substantially the same as an inner diameter of the bottom wall.

5 Claims, 11 Drawing Sheets

(56) References Cited

U.S. PATENT DOCUMENTS

| | | | |
|---|---|---|---|
| 6,574,985 B2 * | 6/2003 | Fiore, Jr. | A45F 3/18 |
| | | | 62/457.4 |
| 6,779,794 B2 * | 8/2004 | Hedrick | G07F 17/3216 |
| | | | 463/47 |
| 7,866,620 B2 * | 1/2011 | Kaemmer | B60N 3/106 |
| | | | 248/314 |
| 7,891,719 B2 * | 2/2011 | Carnevali | B60N 3/12 |
| | | | 296/24.34 |
| 8,061,670 B1 * | 11/2011 | White | B60N 3/10 |
| | | | 248/311.2 |
| 8,807,377 B2 * | 8/2014 | Corbett | B65D 1/0223 |
| | | | 222/105 |
| 9,221,581 B2 * | 12/2015 | Yokota | B60N 3/10 |
| 9,381,843 B2 * | 7/2016 | Muiter | B60Q 3/229 |
| 9,908,689 B2 * | 3/2018 | Schulz | B65D 83/48 |
| 10,232,769 B2 * | 3/2019 | Forrest | B60Q 3/229 |
| 10,506,890 B2 * | 12/2019 | Sawada | B60N 3/105 |
| 10,543,770 B2 * | 1/2020 | Grau | B60N 3/107 |
| 10,640,028 B2 * | 5/2020 | Koarai | B60N 3/106 |
| 10,743,633 B2 * | 8/2020 | Cooper | A45C 11/00 |
| 10,875,437 B2 * | 12/2020 | Lee | B60N 3/106 |
| 11,503,934 B1 * | 11/2022 | Wegner | B65D 81/3876 |
| 11,505,106 B2 * | 11/2022 | Kotsuji | B60N 3/105 |
| 2009/0039095 A1 * | 2/2009 | Ogura | B60N 3/102 |
| | | | 220/737 |
| 2020/0231020 A1 * | 7/2020 | Kim | A47J 39/003 |

\* cited by examiner

CUP HOLDER

RELATED APPLICATIONS

The present application is based on, and claims priority from, Japanese Application No. JP2022-173468 filed Oct. 28, 2022, the disclosure of which is hereby incorporated by reference herein in its entirety.

FIELD OF THE INVENTION

The present invention relates to a cup holder, which is installed in a cabinet of a vehicle and so on, and holds a drink container (the container includes a PET bottle, a cup, a can and so on) by inserting the container into a retaining portion thereof.

BACKGROUND OF THE INVENTION

FIGS. 11(a) and 11(b) show a cup holder disclosed in a Patent Document 1, wherein FIG. 11(a) is a perspective view showing a holder main body in a condition that arms (holder) and urging members are omitted, and FIG. 11(b) is a sectional view in a condition that the drink container is retained in a retaining portion. A cup holder H in the drawings includes the retaining portion (holding portion) 13, where a drink container Y (hereinafter, called a container) Y is inserted from an upper opening of the retaining portion and held on a bottom wall 11 in a plate shape of the receiving portion.

Here, the retaining portion 13 has approximately a cylindrical shape by an upper opening for receiving the container Y, the bottom wall 11 supporting the bottom of the container Y and a side wall 12 defining the upper opening and the bottom wall 11. Also, the side wall 12 includes openings 23 for arranging arms (holder) 14 at plural portions.

In each of the openings 23, as shown in FIG. 11(b), it is arranged in a condition that an arm 14 is supported rotatably at a support point 31, and is urged toward the retaining portion 13 by a spring 40. Also, in the opening 23, a regulating member 32 is provided to protrude between side portions, and regulates movement of the arm 14 at a maximum holding position. In case a user pushes the arm 14 by a finger to release a condition where the arm 14 is caught at a constriction of the container when the container Y is pulled up from the retaining portion 13, the arm 14 pushed into the opening 23 hits to restrict the movement to the pushing direction. Accordingly, the load applied to the shaft portion 31 is mitigated to prevent damage to the shaft portion.

PRIOR ART ARTICLE

Patent Document

Japanese Patent Publication 2010-89592

SUMMARY OF THE INVENTION

Problems to be Solved by the Invention

In the prior art structure as shown in the Patent Document 1, there are following problems. FIGS. 10(a) and 10(b) show the drawing for explaining the problems. The holder main body 10A in the drawings includes a receiving panel 8 and a design panel 9 integrated with an upper portion of the receiving portion 8. In the receiving portion 8, a side wall 8b has a radial diameter increasing from a bottom wall 8a in a plane shape to an upper opening 8c as it goes upward. In the design panel 9, the side wall 9b continues to the side wall 8b, and the upper opening 9c has an edge by a flange 9a. In the conventional structure, when the holder main body is made by an injection molding, as understood in FIG. 10(a), the side wall has a diameter gradually increasing toward upward due to inclination for demolding. Namely, the side wall inclines largely toward outward. As a result, assuming that the PET bottom A falls by vibration as shown in the dotted lines, it is necessary to suppress the falling angle not to be so large. In other words, as the falling angle of the bottle is becoming smaller in proportion to the depth from the upper opening to the bottom wall, it is set such that the depth L1 is set to the corresponding falling angle accepted thereto. However, it is difficult to set the depth L1 shallow. As a result, as shown in FIG. 10(b), in case the cup is inserted into and taken out, since a finger is hard to catch the cup, the insertion and taking out ability are not good and easiness of use is not good.

Also, in the conventional structure, the bottom wall where the receiving portion holds the container is made horizontally. Thus, when a strong inertia is applied to the container held due to sudden braking and so on, the container moves to easily generate the hitting sound. This thing occurs in case the container is held by a plurality of arms as shown in the Patent Document 1, and it is desirable to prevent unnecessary movement of the container.

An object of the present invention is to solve the above problems, and to provide a cup holder which can support a various containers stably without becoming the falling angel of the container larger, and improve easiness of use while keeping the appearance good. Other objects of the invention will be apparent from the following explanation of the invention.

Means for Solving the Problems

In order to attain the above objects, a first aspect of the invention is specified with reference to the drawings. A cup holder comprises a holder main body 1 having a retaining portion 1A for entering into and taking out a beverage container A-C, the retaining portion being configured to receive and hold the beverage container on a bottom wall 23, 33. The retaining portion 1A includes an upper opening 24, 34 for receiving the beverage container, the bottom wall 23, 33 for supporting a bottom of the beverage container, and a side wall 22, 32 forming between the upper opening and the bottom wall, and has a cylindrical shape. An inner diameter at an upper opening portion side is substantially the same as an inner diameter at an bottom wall side.

It is preferable that the above invention is specified, as follows.

(a) In the holder main body, the retaining portion has a cylindrical shape which is divided to left and right by a first holder half and a second holder half (second aspect).

(b) The first and second holder halves are rotatably connected at bottom sides of the first and second holder halves by an engagement of a shaft and an engaging portion, and side wall portions of the first and second holder halves are arranged close to each other and integrated by an engagement of a claw piece and an engaging hole (third aspect).

(c) The holder main body further comprises a design panel assembled at an upper side. In a condition that the first and second holder halves are integrated together, a connecting member is inserted through a through hole formed in the claw piece and connected together with the design panel side (fourth aspect).

(d) The bottom wall of the holder main body has substantially a mortar shape (fifth aspect).

(e) The holder main body further includes an arm for pressing a side area of the beverage container inserted into the retaining portion and restricting a lateral movement of the beverage container (sixth aspect).

Advantages of the Invention

In the first aspect of the invention, the retaining portion is formed, when comparing with a conventional one, with a cylindrical shape where the inner diameter at the upper opening side and the inner diameter at the bottom wall side are substantially the same, i.e. the side wall has a vertical shape. Thus, a falling angle of the container is suppressed. As a result, various containers can be stably held by suppressing the falling angle of the container, so that using convenience can be improved while keeping the appearance.

In the second aspect of the invention, the retaining portion has a cylindrical shape, and is divided, left and right, into the first holder half and the second holder half. Thus, it is surely possible to form the cylindrical shape where the inner diameter at the upper opening side, and the inner diameter at the bottom wall side have substantially the same size.

In the third aspect of the invention, the first holder half and the second holder half are rotatably connected by the engagements of the shaft at the bottom wall sides and the engaging portions, and the side walls are arranged to come close to each other and are connected by the claw piece and the engagement hole to integrate together. Thus, it is possible to form easily without increasing the number of parts.

In the third aspect, as passage of time after formation, the divided parts may possibly have wobbling and be disengaged by a large force. In the fourth aspect, it is possible to prevent the generation of the wobbling and the unexpected disengagement of the divided parts by connecting together by, such as a screw.

In the fifth aspect of the invention, as shown in FIGS. 9(*a*) and 9(*b*), the container inclines in the falling condition according to the mortar shape by the vibration and so on of the vehicle. Thus, the falling angle of the container can be suppressed while reducing the height size L.

In the sixth aspect of the invention, the holder main body further includes an arm for pressing a side area of the beverage container inserted into the retaining portion and restricting a lateral movement of the beverage container. Thus, even if the container held receives a large load or vibration by emergency braking and so on, the container hardly falls

DETAILED DESCRIPTION OF PREFERRED EMBODIMENTS

Figure 1A:
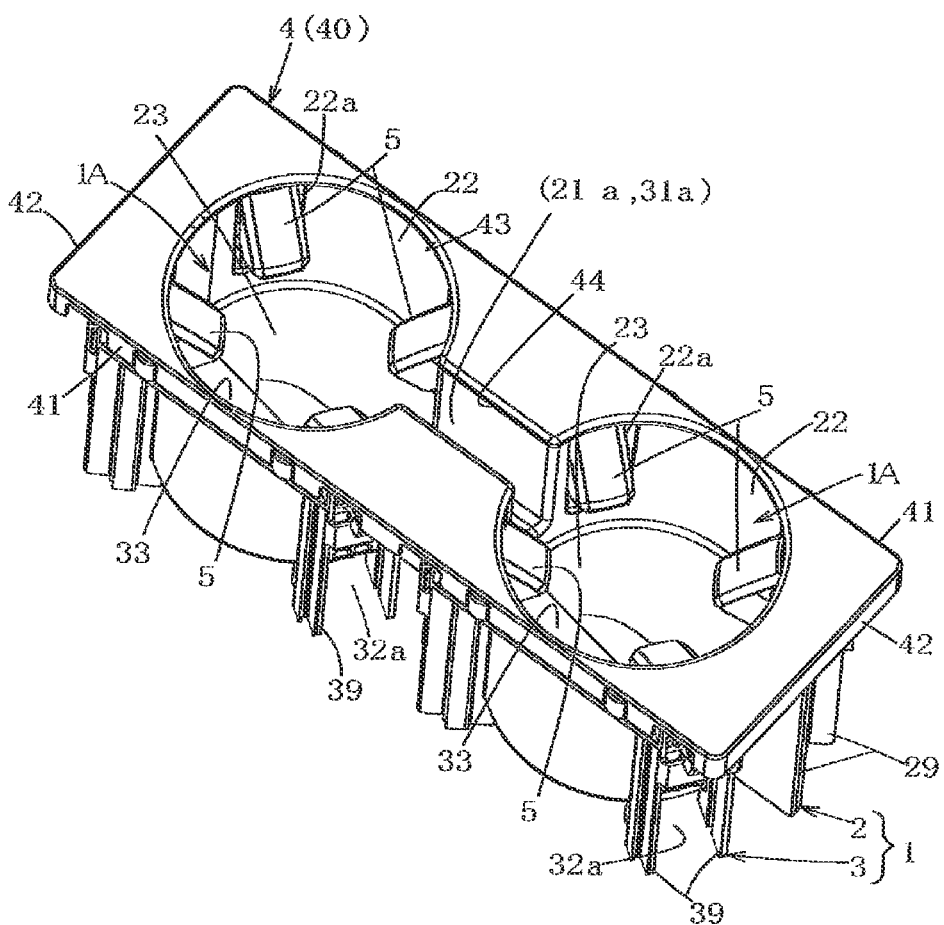
FIG. 1(*a*) is a perspective view of a cup holder of the invention, and FIG. 1(*b*) is a perspective view showing an arm and an urging member.

Hereinafter, embodiments of the cup holder of the invention are explained with reference to the drawings. In the explanation, after the structure of the cup holder is clarified, a main operation is explained.

(Structure)

As shown in FIG. 1(*a*) to FIG. 9(*b*), the cup holder of the embodiment is a type wherein a holder main body 1 having two cylindrical retaining portions 1A for inserting and taking out drinking containers receives the drinking containers in the retaining portions 1A and supports on the retaining bottom walls 23, 33. The main innovative points are that the holder main body 1 is divided into left and right by a first holder half 2 and a second holder half 3, that each of the retaining portions 1A has a cylindrical shape by an upper opening 24. 34, a bottom wall 23, 33 supporting a bottom of the drinking container, and a side wall 22, 32 forming portions between the upper opening 24, 34 and the bottom wall 23, 33, that the holder main body 1 includes a design panel 4 assembled to an upper side and is fixed together to a design panel side by a fixing member 7 in an integrated condition where the first holder half 2 and the second holder half 3 are engaged together, and that each of the bottom walls 23, 33 of the holder main body 1 is formed with an approximate mortar shape. Hereinafter, these detailed structures are clarified.

Incidentally, the cup holder which is a subject of the invention is assembled with, for example various consoles, such as a center console and so on in a varied condition in a compartment of a vehicle, similar to the Patent document 1. However, the installation place and an arrangement condition are not especially limited.

Here, the first holder half 2 and the second holder half 3 are, as shown in FIG. 1(*a*) to FIG. 7(*b*), an injection molded products of a synthetic resin, wherein the respective bottom wall 23, 33 sides are rotatably connected by engagements of shaft portions 25, 26 and engaging portions 35, 36, and the side walls 22, 24 at the front and back end 20, 30 sides are situated adjacent to each other and are integrated by the engagements of claws 37*a* at front ends of the claw pieces 37 and engagement holes 20*d*. Also, the first holder half 2 and the second holder half 3 have a shape to define two retaining portions 1A with separating portions 21, 31 interposed therebetween, and include, for the respective retaining portions 1A, the upper openings 24, 34 for receiving the containers, the bottom walls 23, 33 for receiving the bottom of the containers, and side walls 22, 32 forming between the upper openings 24, 34 and the bottom walls 23, 33. Also, the separating portions 21, 31 have, in an integrated condition of the two holder halves 2, 3, step portions 21a, 31a inside thereof to communicate the two retaining portions 1A.

The front and back ends 20, 30 include, as shown in FIGS. 3(a) to 4(b), dent portions 20a, 30a formed at the upper sides, bottom faces 20b, 30b of the dent portions 20a, 30a, and cavities 20c, 30c provided at the lower sides of the bottom faces 20b, 30b. Also, as shown in FIG. 3(c), the bottom face 20b includes an engaging hole 20d engaging the claw 37a, and an insertion hole 20e for inserting a connecting member 7. The front and back ends 20 include rectangular windows 20f penetrating downward from the bottom face 20b. On the other hand, the front and back ends 30 include the claw pieces 37 projecting at the portion corresponding to the windows 20f. As shown in FIG. 4(a), the claw piece 37 includes a claw 37a projecting at the front upper face side, elastic legs 37b formed at two sides, and a penetrating hole 37c formed at a near side of the claw 37a.

Figure 4A:
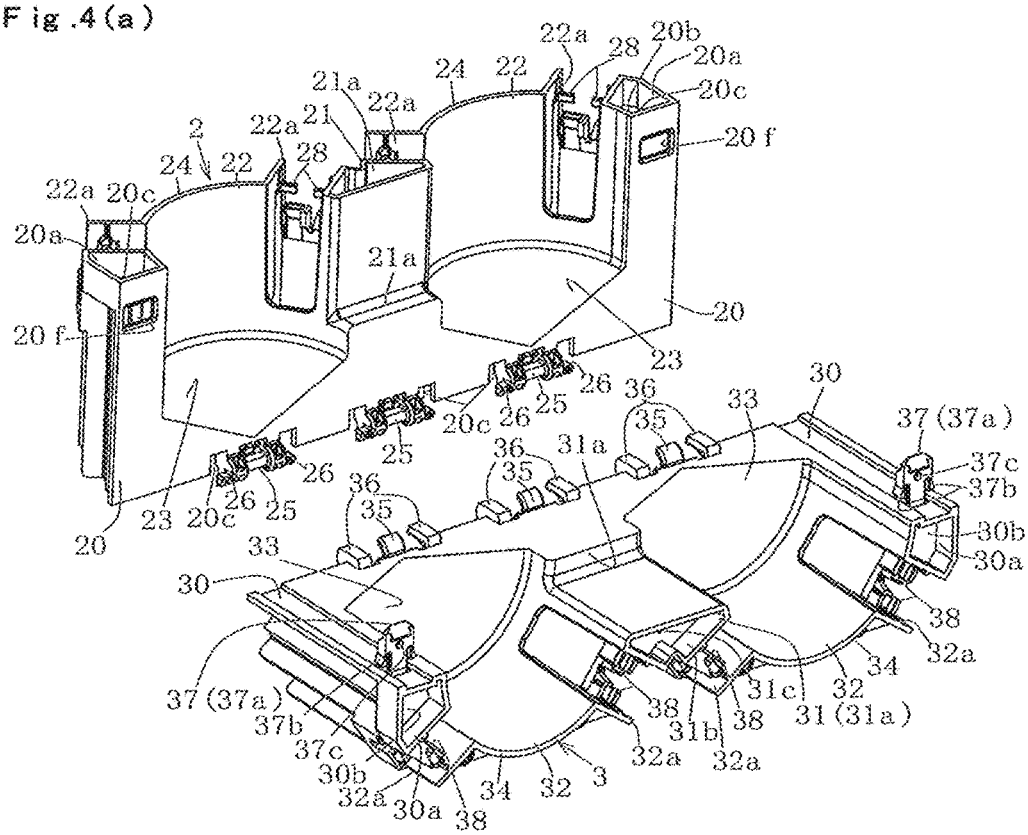
FIGS. 4(*a*) and 4(*b*) are perspective views showing a separated condition and a connected condition of a half of the first holder and a half of the second holder.
Figure 4B:
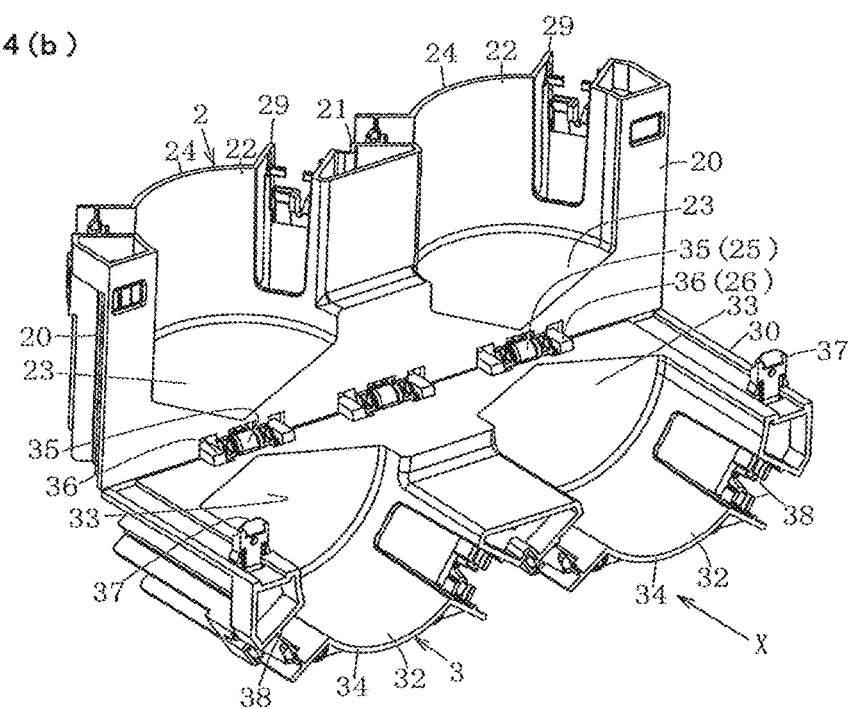
Figure 5:
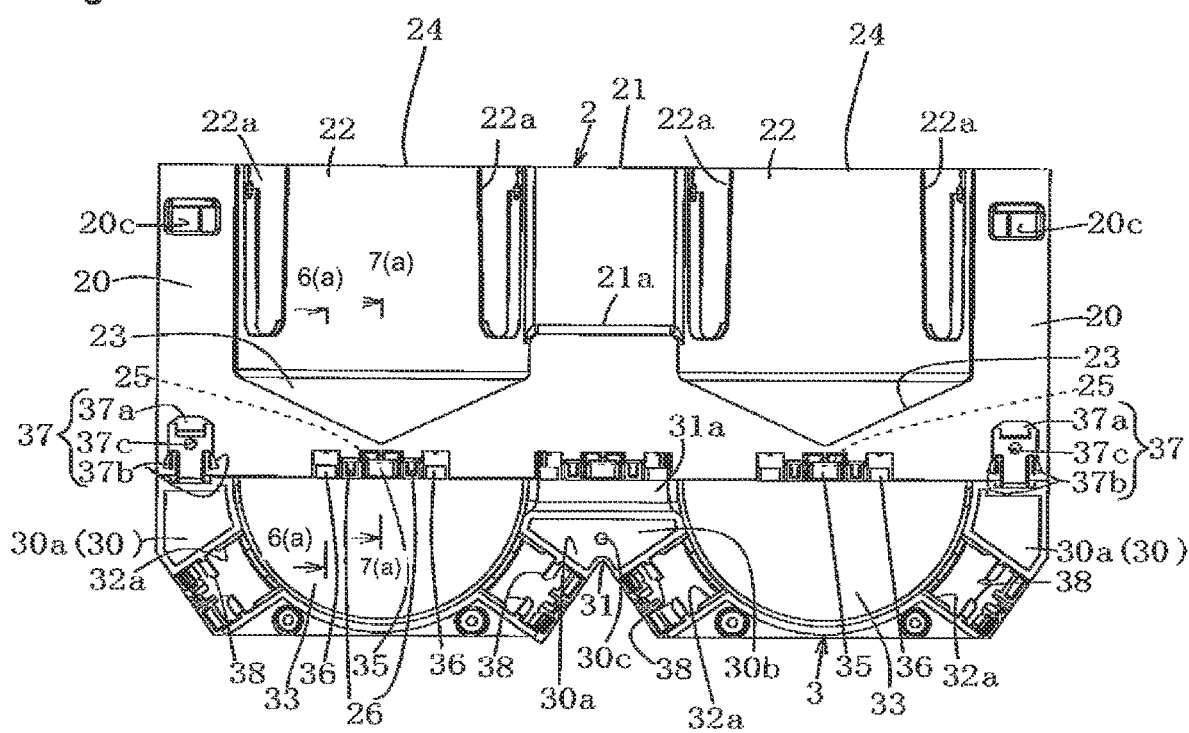
FIG. 5 is a view seen from an X direction in FIG. 4(*b*).
Figure 6A:
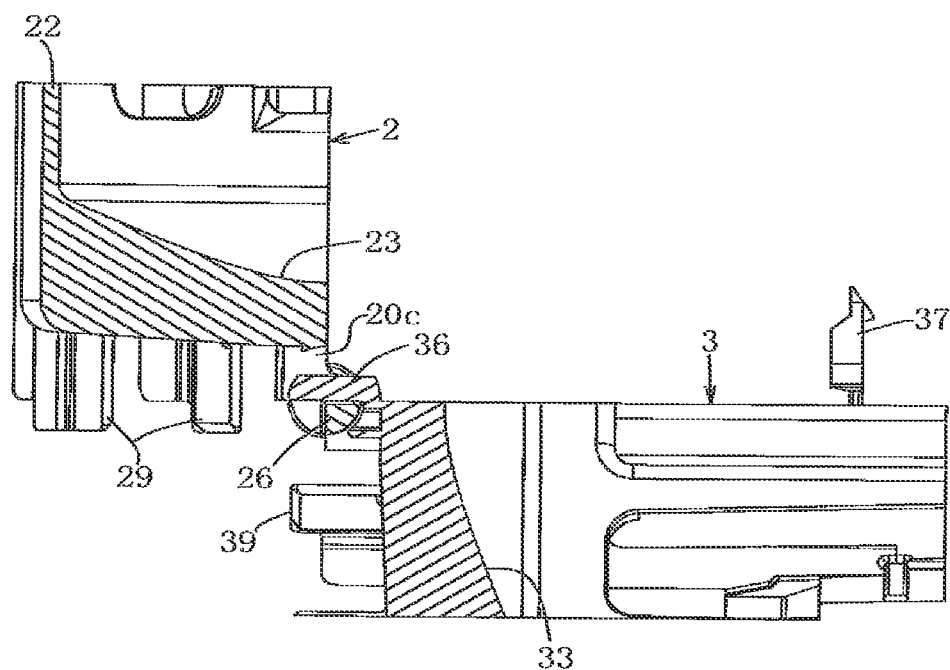
FIG. 6(*a*) is a sectional view taken along a line 6(*a*)-6(*a*) in FIG. 5, and FIG. 6(*b*) is a partial sectional view wherein the half of the second holder shown in FIG. 6(*a*) is rotated to a side of the half of the first holder to integrate together.
Figure 6B:
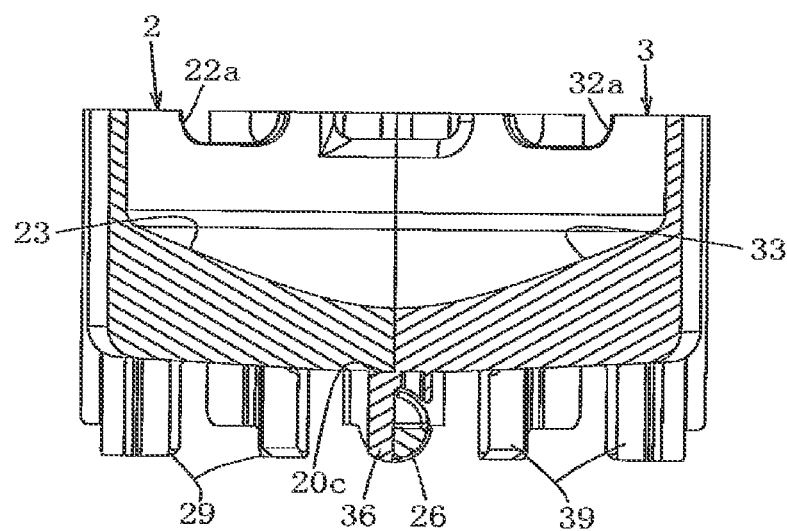
Figure 8A:
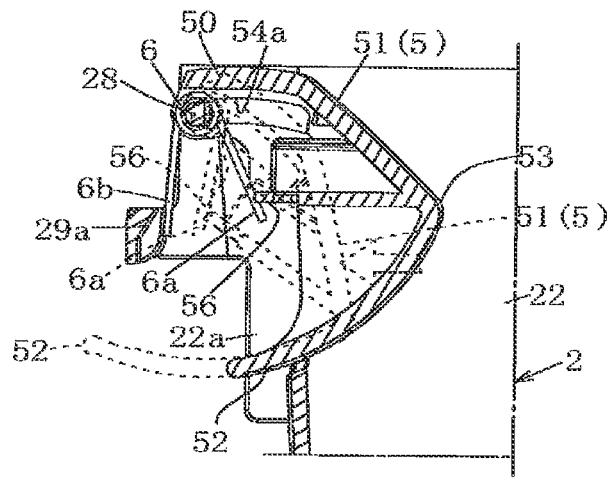
FIG. 8(*a*) shows a sectional view showing a condition that the arm does not receive a load and a condition that the arm receives a load, FIG. 8(*b*) shows a sectional view showing a condition that the arm receives the load and retracted to the opening portion, and FIG. 8(*c*) shows a sectional view showing a condition that the arm receives an applied force in an upward direction and an upper side is rotated to the retracting direction.
Figure 8B:
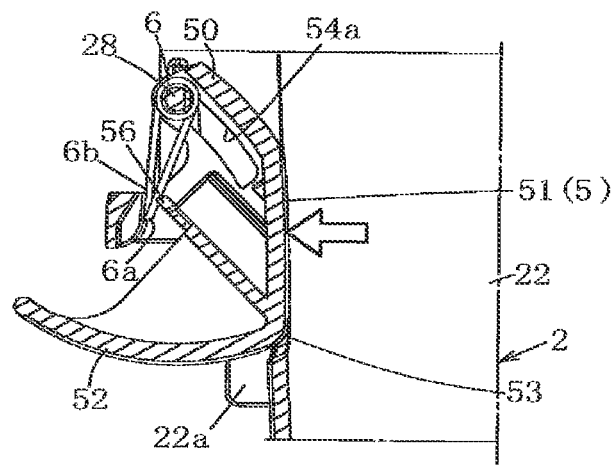
Figure 8C:
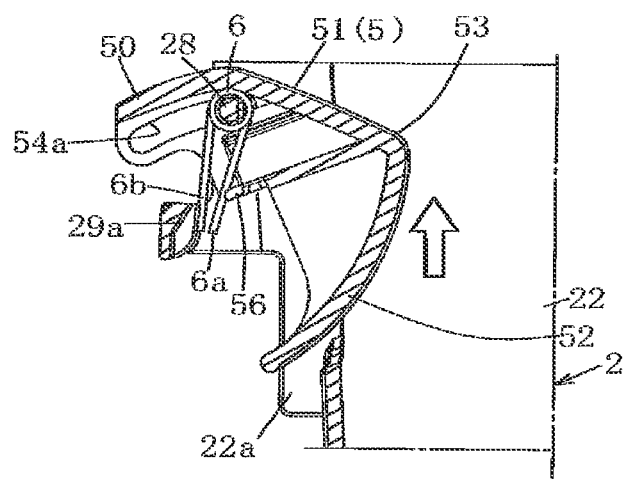

In each side walls 22, 32, two openings 22a, 32a are formed between the front and back end portions 20, 30 and the separating portions 21, 31. Each of the opening portions 22a, 32a is a portion to arrange the arm 5 swingably, and as shown in FIG. 4(a), includes a pair of shaft portions 28, 38 provided at the respective inner faces facing each other, and as shown in FIGS. 8(a)-8(c), engaging apportions 29a engaging the other end 6b of the urging member 6 (engaging portions 39a at the opening portion 32a side is omitted). Numerals 29, 39 are vertical plates projecting to face at both sides of the opening portions 22a, 32a. The shaft portions 28, 38 are provided to project on the vertical plates 29, 39. Incidentally, the separating portions 21, 31 are substituted by vertical plates at the side faces on both sides. (refer to FIGS. 4(a) and 4(b))

Figure 3A:
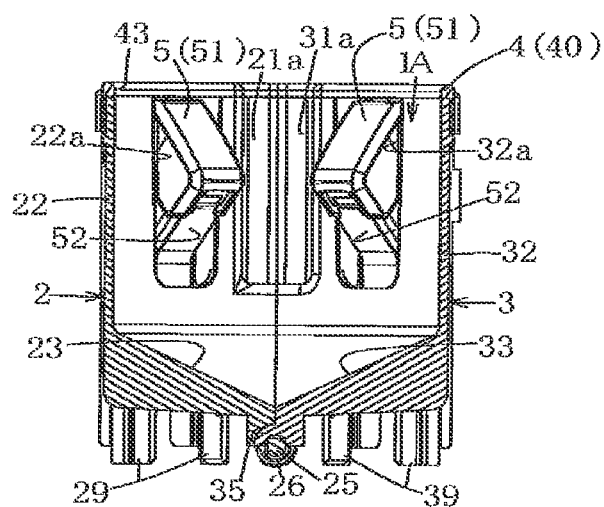
FIGS. 3(*a*) and 3(*b*) are sectional views at cutting lines 2(*a*)-2(*a*) and 2(*b*)-2(*b*) in FIG. 2(*b*), respectively, and FIG. 3(*c*) is an enlarged view of 3(*c*) in FIG. 3(*b*).
Figure 9A:
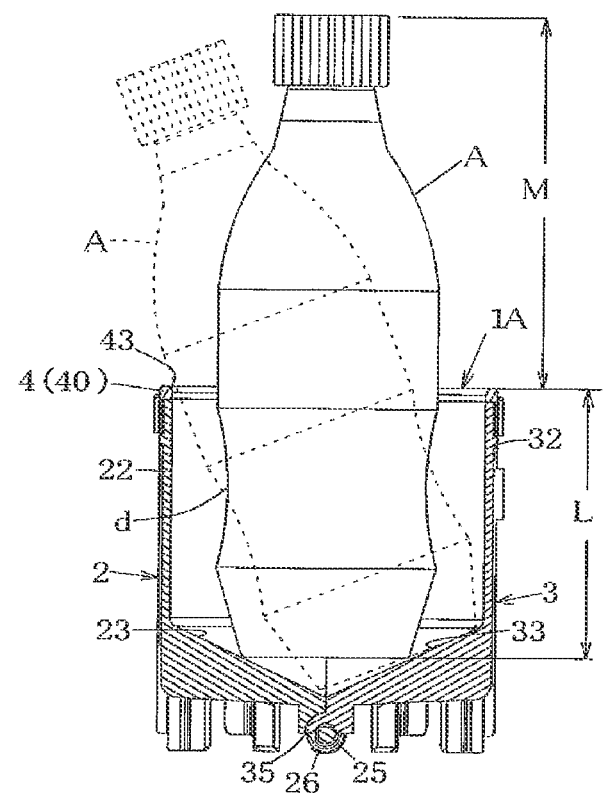
FIGS. 9(*a*) and 9(*b*) are diagrams showing an operation of a bottom wall in mortar shape of the invention.
Figure 9B:
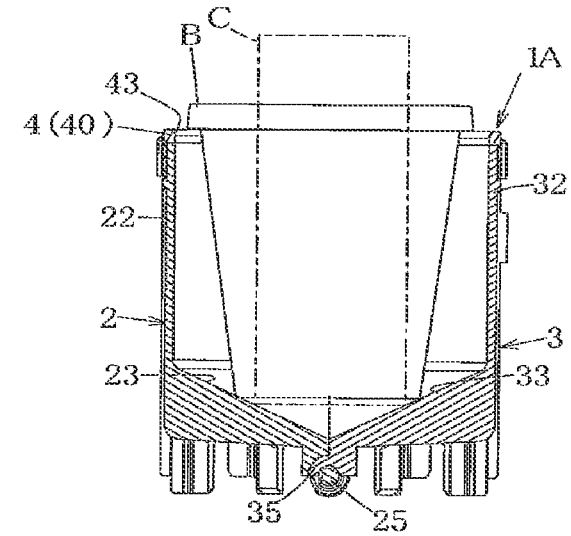

The respective bottom walls 23, 33 are set, as shown in FIG. 3(a), to form a mortar shape in a condition where the holder halves 2, 3 are integrated. Namely, the bottom walls 23, 33 of the retaining portion 1A are portions for supporting the bottom of the container, and in a condition that the holder halves 2, 3 are integrated, the container is held at the proper position in the mortar. FIGS. 9(a) and 9(b) show one example, wherein FIG. 9(a) shows holding the PET bottle A, and FIG. 9(b) shows supporting a cup B and a can C. Namely, as the diameter of the container is becoming smaller, the container is supported at the lower side of the mortar shape.

The above first holder half 2 and the second holder half 3 are rotatably connected at the respective bottom wall sides by engagements of the shaft portions 25, 26 and engagement portions 35, 36, and thereafter, as explained above, the respective side walls 22, 32 are made to come close to each other to integrate together by engagements of the claws 37a and engagement holes 20d. Namely, as shown in FIG. 4(a) to FIG. 7(b), the shaft portions 25, 26 include depressions 20c at three portions at a lower end side below the bottom portion 23 of the first holder 2, and are formed in the respective dent portions 20c with a long shaft portion 25 and short shaft portions 26 at both sides, as a pair. Above the shaft portions 25, 26, spaces 20c are provided. In the spaces 20c, engagement portions 35, 36 in a form of a piece are inserted.

Figure 7A:
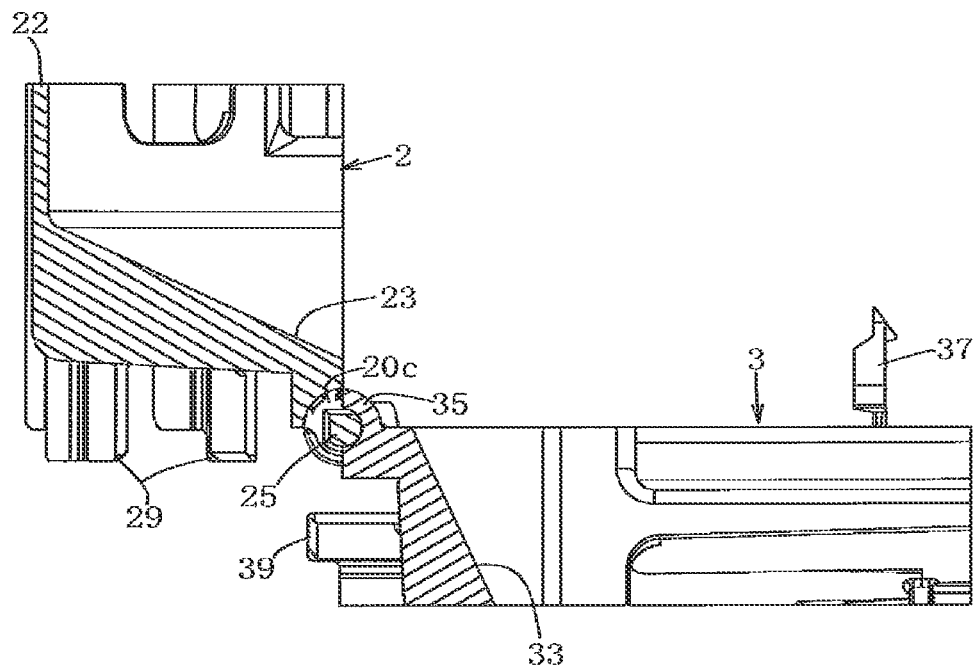
FIG. 7(*a*) is a sectional view taken along a line 7(*a*)-7(*a*) in FIG. 5, and FIG. 7(*b*) is a partial sectional view wherein the half of the second holder shown in FIG. 7(*a*) is rotated to a side of the half of the first holder to integrate together.
Figure 7B:
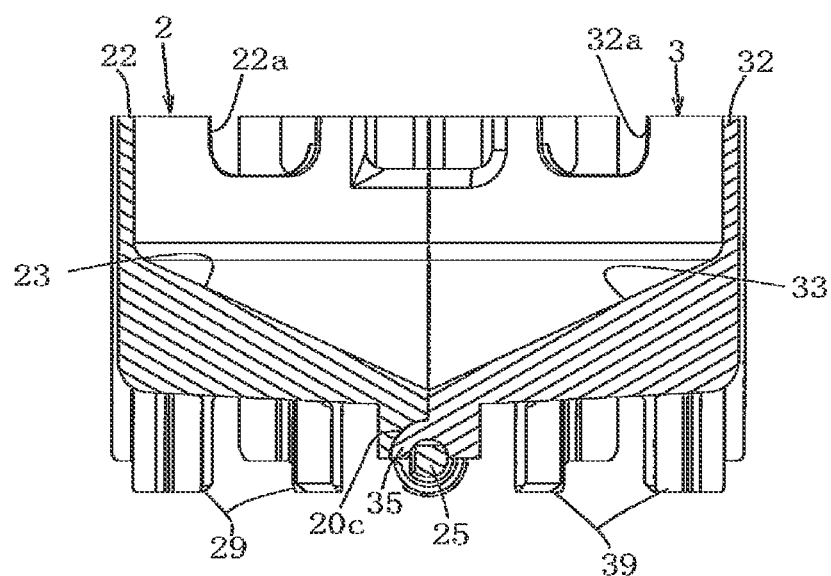

Namely, the second holder half 3 is rotatably connected to the first holder half 2, as shown in FIG. 7(a), by directing the middle engagement portion 35 in the form of a piece to the space 20c and inserting the engagement portions 36 on both sides to the corresponding spaces 20c. Thereafter, as shown in FIG. 7(b), when the second holder half 3 is rotated about 90 degrees to the direction of the first holder half 2 around the shaft portions 25, 26 as support points, the engagement portions 35 in the form of pieces engage the spaces 20c, so that the engagement portions 36 in the form of a piece engage the back side of the shaft portions 26 through the spaces 20c. At the same time, in the both holder halves 2, 3, when the claw pieces 37 enter the windows 20f and the elastic legs 37b on both sides enter the windows 20f with elastic deformation, the elastic pieces 37 return to the original condition at the completion of the insertion, so that the elastic pieces 37 are restricted not to be accidentally disengaged from the windows 20f. Also, as explained above, the claws 37a engage the engagement holes 20d to be integrated as a holder main body 1.

Figure 1B:
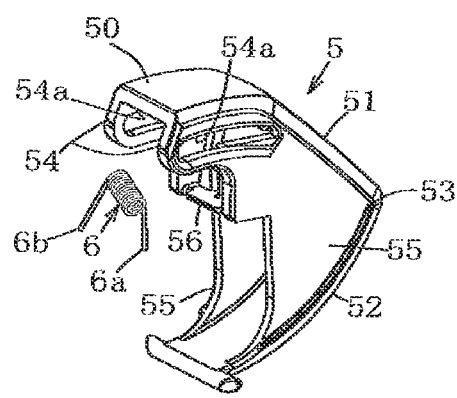
Figure 2A:
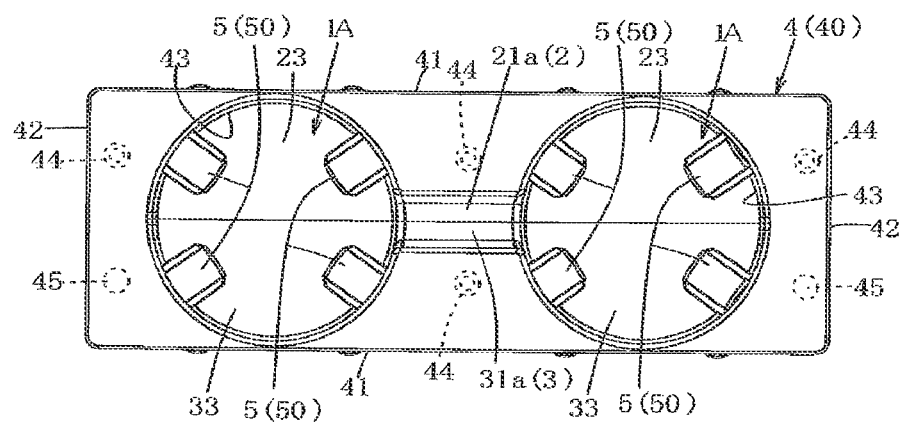
FIGS. 2(*a*) and 2(*b*) are a plan view and a front view of the above cup holder, and FIG. 2(*c*) is a bottom view wherein the arms and the urging members are omitted.
Figure 2B:
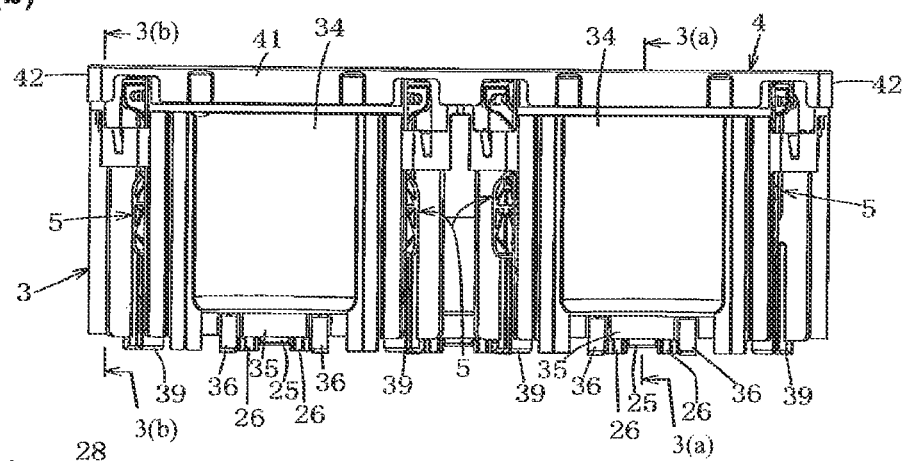
Figure 2C:
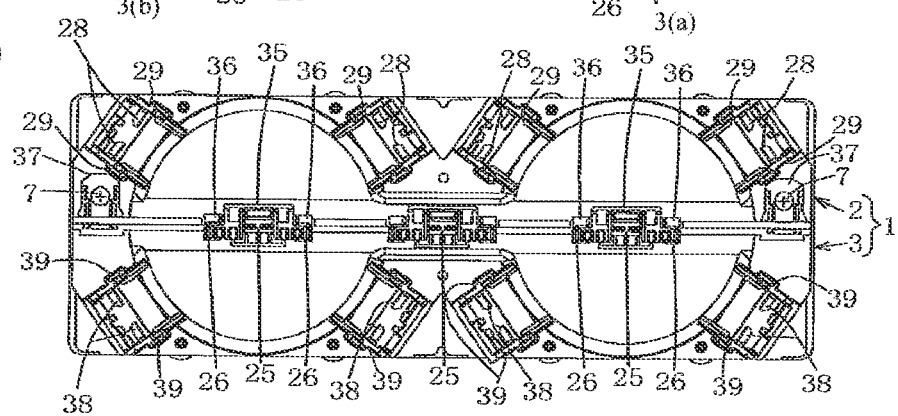
Figure 3B:
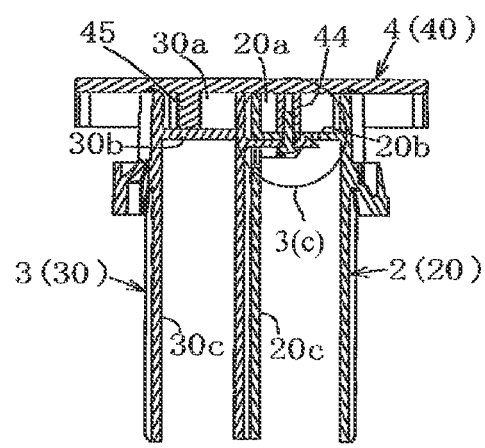
Figure 3C:
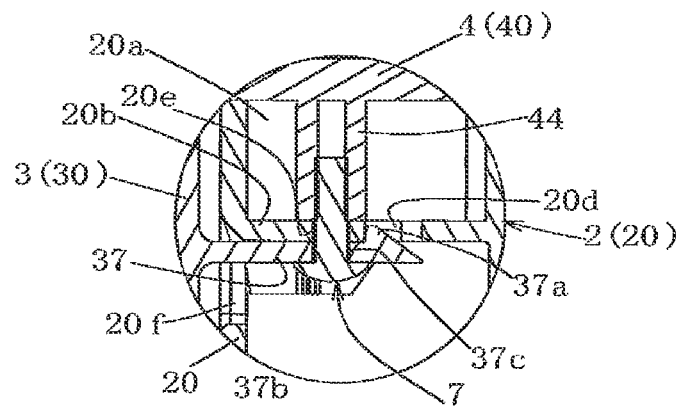

The above holder main body 1 is assembled with the design panel 4 on the upper part, and the arms 5 and the urging members 6 are assembled in the respective opening portions 22a, 23a. The design panel 4 is a synthetic resin product, and as shown in FIGS. 1(a) and 1(b), includes a plate portion 40, end faces 41 on both sides, end faces 42 on the front and back sides, two openings 43 formed in the plate portion 40, and a communication portion 44 corresponding to the step portions 21a, 31a for communicating the openings 43. Also, on the rear face, as shown in FIG. 2(a) and FIGS. 3(b), 3(c), the design panel 4 at least includes cylindrical portions 44 and bosses 45 projected on left and right sides, and left and right cylindrical portions at the middle thereof. Namely, the cylindrical portions 44 and the bosses 45 may be provided more according to necessity.

And, the above design panel 4 is placed in position on the holder main body 1, and as shown in FIGS. 3(b) and 3(c), the connecting member 7 is inserted into the cylindrical portion 44 from the through hole 37c through the insertion hole 20e provided at the bottom face 20b of the dent portion 20a, so that the holder halves 2, 3 are connected together with the design panel 4. In addition, the holder halves 2, 3 are firmly fixed to the design panel 4 by inserting the connecting members 7 to the corresponding cylindrical portion 44 from the through holes 21c, 31c provided at the bottom faces 21b, 31b of the dents 21a, 31a of the partitions 21, 31. The bosses 45 contact the bottom face 30b of the dent 30a to prevent wobbling. Incidentally, the connecting member 7 is preferably a tapping screw.

On the other hand, as shown in FIG. 1(b) and FIGS. 8(a)-8(c), the arm 5 has a size corresponding to the opening 22a, 32a, and an approximate shape is an isosceles triangle seen from a side and has a top portion 53 where an upper side 51 and a lower side 52 intersect, and an extension portion 50 where an end of the upper side 51 is approximately horizontally extended. The extension portion 50 has an inverted C-shape in section, and long grooves 54a are formed to face each other on both walls 54 of the inverted C-shape. Also, the arm 5 has an engaging portion 56 provided at a lower portion on the upper side 51 of the both walls 54 and engaging one end 6a of the urging member 6.

The above arm 5 is retained in a condition where the left and right shaft portions 28 projecting into the opening 22a or left and right shaft portions 38 projecting to the opening 32a are slidably inserted into the corresponding long grooves 54a. At that time, the urging member 6 is assembled such that a middle coil portion is engaged with each shaft portion 28 or each shaft portion 38. And, one end 6a of the urging member 6 is engaged with the engaging portion 56, and the other end 6b is engaged with an engaging portion 29a on the opening 22a side or an engaging portion 39a on an opening 32a side (not shown).

Operation

Next, the main operation of the above cup holder is explained with reference to FIG. 8(a) to FIG. 10(b).

Figure 10A:
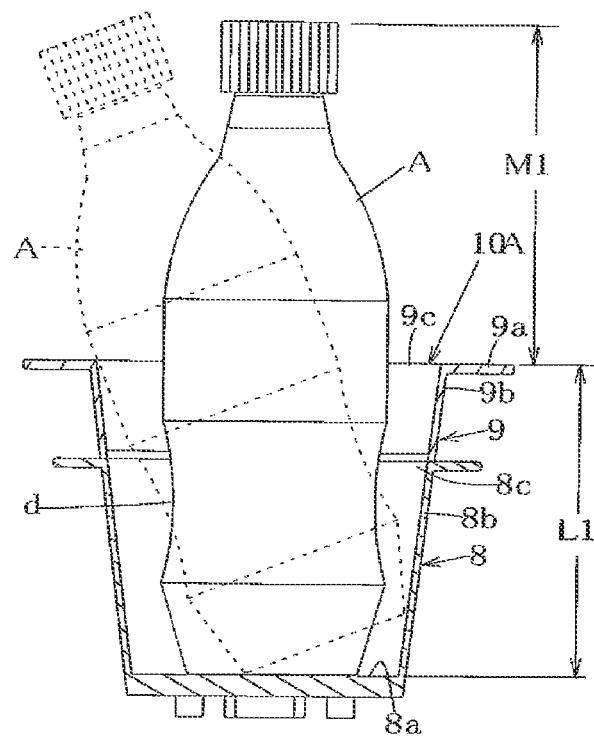
FIGS. 10(*a*) and 10(*b*) are diagrams showing an operation of a bottom wall in a conventional horizontal shape.
Figure 10B:
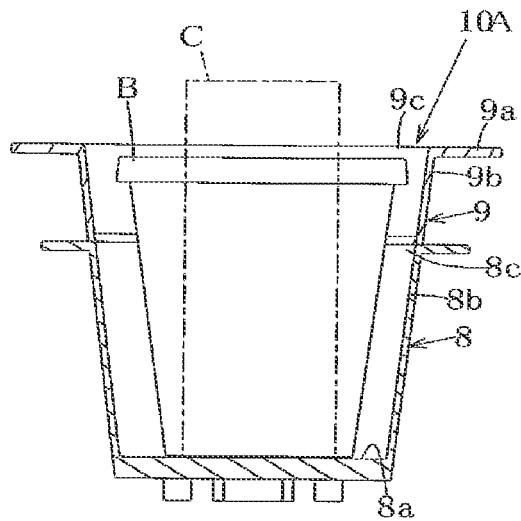
Figure 11A:
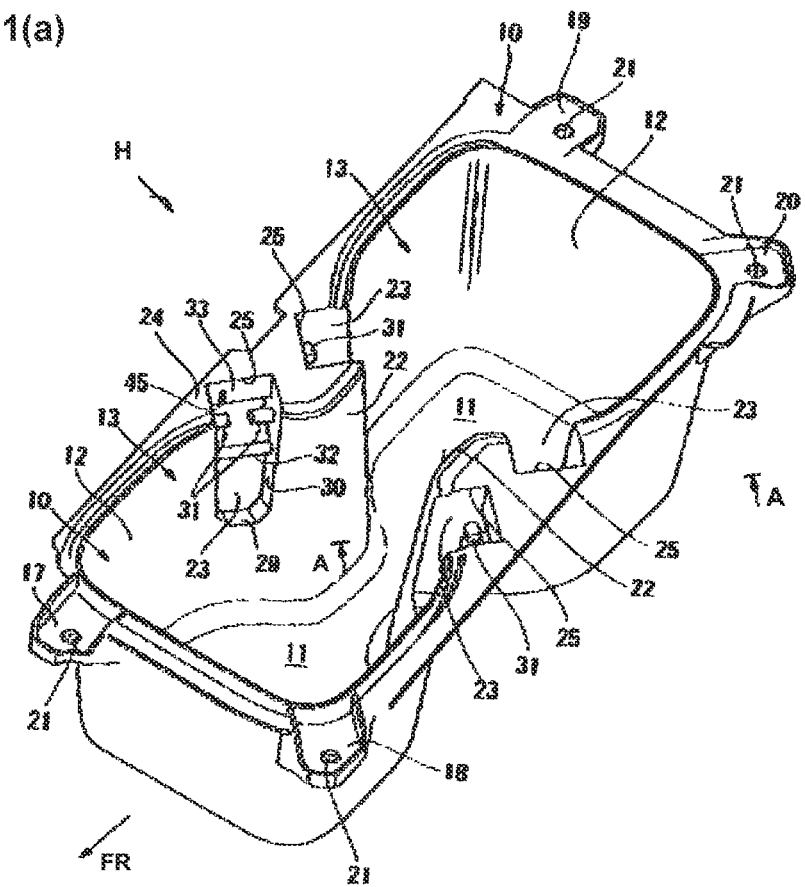
FIGS. 11(*a*) and 11(*b*) show FIG. 2 and FIG. 5(*a*) of the Patent Document 1.
Figure 11B:
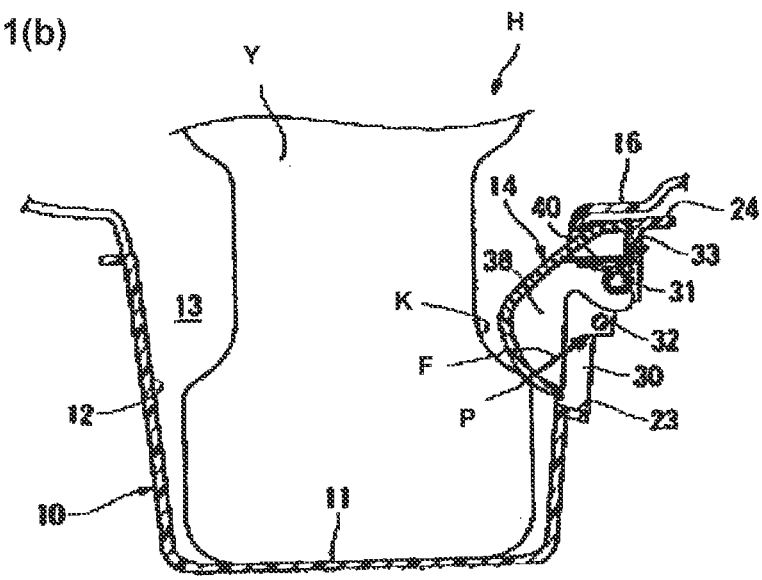

FIG. 8(a) to FIG. 8(c) show an operation of the arm, FIGS. 9(a) and 9(b) schematically show the holding portion 1A of the embodiment, and FIGS. 10(a) and 10(b) schematically show the conventional holding portion 10A.

(1) In the above cup holder of the embodiment, as shown in FIGS. 9(a) and 9(b), the retaining portion 1A has a cylindrical shape such that the inner diameter on the upper opening side, and the inner diameter at the bottom wall 23, 33 side are substantially the same, i.e. the side wall 22, 33 has a vertical face. In the conventional retaining portion 10A as shown in FIGS. 10(a) and 10(b), since the side wall 8b has a larger diameter as it goes upward because of the inclination for demolding, i.e. inclining largely outwardly, assuming that the PET bottle A falls down by the vibration as shown in dotted lines, the depth L1 is set such that the falling angle does not become so great. As a result, in the conventional retaining portion 10A, if the falling angle of the PET bottle A is set as in FIGS. 9(a) and 9(b), the depth L1 at the retaining portion 10A becomes greater than the depth L of the retaining portion 1A of FIGS. 9(a), 9(b), i.e. L1>L, so that the looking and convenience in using go wrong. In the conventional retaining portion 10A and the retaining portion 1A of the present embodiment, it comes to L1>L. Thus, in the length of the PET bottle A exposing outside of the retaining portion, the exposing portion M of the retaining portion 1 as shown in FIGS. 9(a) and 9(b) is smaller than the exposition portion M1 in the retaining portion 10A, i.e. M>M1, so that it is easy to lift the bottle in the retaining portion 1A.

In the cup holder of the present embodiment, as understood from the comparison of FIG. 9(b) with FIG. 10(b), in case the cup B is inserted into and taken out from the retaining portions 1A and 10A, in the conventional retaining portion 10A, a finger of a user hardly touches the cup B when comparing the retaining portion 1A of the embodiment, so that it is inconvenient in insertion and taking out of the cup B. Thus, it has less reliability. In the retaining portion 1A of the embodiment, such inconvenience is easily solved.

(2) In the cup holder of the embodiment, the retaining portion 1A is cylindrical, and the first holder half 2 and the second holder half 3 are divided into left and right. Thus, the side wall 32 can be formed with the cylindrical shape where the inner diameter on the upper opening side and the inner diameter on the bottom wall side are substantially the same. Also, in the embodiment, the first holder half 2 and the second holder half 3 are rotatably connected by the engagement of the shaft portions 25, 26 and the engagement portions 35, 36 on the bottom wall sides 23, 33, and the side walls 22, 32 are arranged to come close to each other and the claw pieces 37 and the engagement holes 20d are engaged to integrate together. Thus, the number of the parts is not increased and can be made easily. Incidentally, in the structure to integrate together by the engagement structure, rattling may occur in the divided portions after formation by the change over time, and the engagement may be disassembled by large load. In this possibility, rattling and undesirable disengagement can be surely prevented wherein in the condition that the respective holder parts are integrated, the respective holder halves 2, 3 are fixed together to the design panel 4 side by the connecting members 7, such as screws. The reliability can be improved.

(3) In the cup holder of the embodiment, since the bottom walls 23, 33 of the retaining portion 1A are formed with a mortar shape in the integrated form, as shown in FIG. 9(a), since the PET bottle A is inclined at an angle corresponding to the mortar shape by the vibrations and so on, it is possible to suppress the falling angle of the PET bottle A while suppressing the size of the height L. Also, as assumed by comparing FIG. 9(b) and FIG. 10(b), the drinking container, such as a cup B and a can C, is hard to move when holding on the position in the mortar shape as in the embodiment when comparing with the case where the container is held on the horizontal plane as shown in FIG. 10(b). The resistance relative to the movement becomes greater, so that holding ability is excellent.

(4) Since the above embodiment includes a plurality of arms 5 restricting movement of the drinking container in the radial direction by press contacting the surrounding of the drinking container inserted into the retaining portion 1A, if the drinking container receives a large load and a vibration such as emergency braking, the drinking container hardly falls. In detailed, the solid lines in FIG. 8(a) show a condition where the arm 5 does not receive a load from the container side, and the dotted lines in FIG. 8(a) show a condition that the arm 5 receives a load from the container side. The arm 5 indicated by the solid lines is in the initial condition where no load is applied from the drinking container. From this condition, when the drinking container is inserted into the retaining portion, as indicated by the dotted line, the drinking container hits the inclining portion 51 at an upper portion of the arm, so that the arm rotates in the clockwise direction by its load around the shaft portions 28, 38 as a fulcrum. FIG. 8(b) shows a condition where the arm 5 rotates to the maximum by the load received from the container side, and retracts into the opening 22a. FIG. 8(c) shows a situation wherein, for example, the PET bottle not shown is restricted in the radial direction by the arm 5, and is taken out, and the top 53 of the arm 5 engages the constriction portion which has a small diameter of the PET bottle (the portion indicated by numeral d in FIG. 9(a)). At this time, the arm 5 is pushed at the upper side to the inside of the opening 22, and the shaft portion 28 moves to the end in the opposite side of the long groove 54a, so that the PET bottle can be withdrawn.

Incidentally, the invention is sufficient to have the structure defined in the claims, and the detailed portion may be changed according to the necessity. For example, the arm and the urging member may be omitted, and the urging member may be change to a plate spring. Also, the diameter of the retaining portion is set slightly bigger than the relatively large container diameter among general drinking containers, such as a PET bottle A, a cup B and a can C. Of course, the retaining portion 1A can retain a container if a shape is other than the cylindrical shape.

EXPLANATION OF NUMERAL

1: Holder main body
1A: Retaining portion
2: First holder half (22: Side wall, 23: Bottom wall, 24: Upper opening)
3: Second holder half (32: Side Wall, 33: Bottom wall, 34: Upper opening)

4: Design panel (40: Plate portion, 43: Opening, 44: Communicating portion)
5: Arm (51 and 52: Inclination portion, 54a: Long groove, 56: Engaging portion)
6: Urging member (6a: One end, 6b: Other end)
7: Connecting member
8: Conventional holder main body
9: Conventional design panel
10A: Conventional retaining portion
20d: Engaging hole
20, 30: Front, rear ends
25, 26: Shaft portions
22a, 32a: Openings
35, 36: Engaging portions
37: Claw piece (37a: Claw, 37b: Elastic leg, 37c: Through hole)
A: PET bottle
B: Cup (Beverage container)
C: Can (Beverage container)

What is claimed is:

1. A cup holder, comprising:
a holder main body having a retaining portion, the retaining portion being configured to receive and hold a beverage container on a bottom wall,
wherein
the retaining portion includes an upper opening for receiving the beverage container, the bottom wall for supporting a bottom of the beverage container, and a side wall formed between the upper opening and the bottom wall, and has a cylindrical shape, an inner diameter at the upper opening being substantially same as an inner diameter of the bottom wall, and
the holder main body comprises
a first holder half having a first engaging portion,
a second holder half having a second engaging portion, and
a design panel above the first and second holder halves in a condition that the first and second holder halves are integrated together, and connected to the first and second holder halves together by engaging the first engaging portion of the first holder half with the second engaging portion of the second holder half,
the first holder half and the second holder half of the holder main body are formed separately and joined together so that the retaining portion has the cylindrical shape,
the first engaging portion of the first holder half includes one of a piece and a space, and one of a claw piece and an engaging hole,
the second engaging portion of the second holder half includes the other of the piece and the space, and the other of the claw piece and the engaging hole, and
bottom sides of the first and second holder halves are connected by inserting the piece in the space, and side wall portions of the first and second holder halves are connected by engaging the claw piece with the engaging hole to thereby integrate the first and second holder halves.

2. The cup holder according to claim 1, wherein the bottom wall of the holder main body has substantially a mortar shape.

3. The cup holder according to claim 1, wherein the holder main body further includes an arm for pressing a side area of the beverage container inserted into the main body and restricting a lateral movement of the beverage container.

4. A cup holder, comprising:
a holder main body having a retaining portion, the retaining portion being configured to receive and hold a beverage container on a bottom wall,
wherein
the retaining portion includes an upper opening for receiving the beverage container, the bottom wall for supporting a bottom of the beverage container, and a side wall formed between the upper opening and the bottom wall, and has a cylindrical shape, an inner diameter at the upper opening being substantially same as an inner diameter of the bottom wall,
the holder main body comprises
a first holder half having a first engaging portion,
a second holder half having a second engaging portion, and
a design panel above the first and second holder halves in a condition that the first and second holder halves are integrated together, and connected to the first and second holder halves together by engaging the first engaging portion of the first holder half with the second engaging portion of the second holder half
the first holder half and the second holder half of the holder main body are formed separately and joined together so that the retaining portion has the cylindrical shape,
the first engaging portion of the first holder half includes one of a shaft and an engaging portion, and one of a claw piece and an engaging hole,
the second engaging portion of the second holder half includes the other of the shaft and the engaging portion, and the other of the claw piece and the engaging hole, and
bottom sides of the first and second holder halves are rotatably connected by the shaft and the engaging portion, and side wall portions of the first and second holder halves are connected by the claw piece and the engaging hole to thereby integrate the first and second holder halves.

5. A cup holder, comprising:
a holder main body having a retaining portion, the retaining portion being configured to receive and hold a beverage container on a bottom wall, wherein
the retaining portion includes an upper opening for receiving the beverage container, the bottom wall for supporting a bottom of the beverage container, and a side wall formed between the upper opening and the bottom wall, and has a cylindrical shape, an inner diameter at the upper opening being substantially same as an inner diameter of the bottom wall,
the holder main body comprises a first holder half and a second holder half, which are formed separately and joined together so that the retaining portion has the cylindrical shape,
the first holder half includes one of a shaft and an engaging portion, and one of a claw piece and an engaging hole,
the second holder half includes the other of the shaft and the engaging portion, and the other of the claw piece and the engaging hole,
bottom sides of the first and second holder halves are rotatably connected by the shaft and the engaging portion, and side wall portions of the first and second holder halves are connected by the claw piece and the engaging hole to thereby integrate the first and second holder halves, and
the holder main body further comprises a design panel, the design panel being disposed above the first and second holder halves in a condition that the first and second holder halves are integrated together, and connected to the first and second holder halves together by a connecting member inserted through a through hole formed in the claw piece.

\* \* \* \* \*